(12) United States Patent
Shin et al.

(10) Patent No.: US 9,112,603 B2
(45) Date of Patent: Aug. 18, 2015

(54) APPARATUS AND METHOD FOR MEASURING A DELAY

(71) Applicant: Electronics and Telecommunications Research Institute, Daejeon (KR)

(72) Inventors: Jongyoon Shin, Daejeon-si (KR); Jong-Ho Kim, Daejeon-si (KR); Ji-Wook Youn, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 287 days.

(21) Appl. No.: 13/684,459

(22) Filed: Nov. 23, 2012

(65) Prior Publication Data
US 2013/0129347 A1     May 23, 2013

(30) Foreign Application Priority Data

Nov. 22, 2011   (KR) .................. 10-2011-0122121
Sep. 28, 2012   (KR) .................. 10-2012-0109398

(51) Int. Cl.
  *H04L 12/26*    (2006.01)
  *H04B 10/077*   (2013.01)
  *H04J 3/06*     (2006.01)

(52) U.S. Cl.
  CPC .......... *H04B 10/0775* (2013.01); *H04J 3/065* (2013.01); *H04B 2210/072* (2013.01); *H04J 2203/0057* (2013.01)

(58) Field of Classification Search
  CPC ........................ H04L 43/106; H04L 9/3297

USPC .......... 370/229–238, 248–253, 236.1–236.2, 370/395.4–395.43, 503–519
See application file for complete search history.

(56) References Cited

U.S. PATENT DOCUMENTS

| 7,359,408 | B2  |   | 4/2008  | Kim |
| 8,483,069 | B1  | * | 7/2013  | Bobade et al. ............... 370/241 |
| 8,660,152 | B2  | * | 2/2014  | Fourcand ...................... 370/509 |
| 2001/0053130 | A1 | * | 12/2001 | Tanaka et al. ................ 370/252 |
| 2003/0025959 | A1 |   | 2/2003  | Nagarajan et al. |
| 2004/0066775 | A1 | * | 4/2004  | Grovenburg .................. 370/350 |
| 2007/0140127 | A1 | * | 6/2007  | Frei .............................. 370/238 |
| 2008/0240077 | A1 |   | 10/2008 | Freiberger |
| 2010/0245837 | A1 | * | 9/2010  | Yamamoto .................... 356/491 |

FOREIGN PATENT DOCUMENTS

| JP | 2003143183 A  | 5/2003  |
| KR | 100532299 B1  | 11/2005 |

* cited by examiner

*Primary Examiner* — Thai Hoang
(74) *Attorney, Agent, or Firm* — William Park & Associates Ltd.

(57) ABSTRACT

An apparatus and method for measuring a delay. The apparatus for measuring a delay includes an overhead inserting unit configured to inserting a time stamp into an overhead of a multiframe to be transmitted from a first location to a second location; an overhead extracting unit configured to extract a time stamp from an overhead of a multiframe received from the second location, the time stamp including bypass delay information of the second location; and a delay measuring unit configured to measure a round trip delay between the first location and the second location using the inserted time stamp and the extracted time stamp and adjust the measured round trip delay using the extracted bypass delay information.

18 Claims, 12 Drawing Sheets

FIG. 1
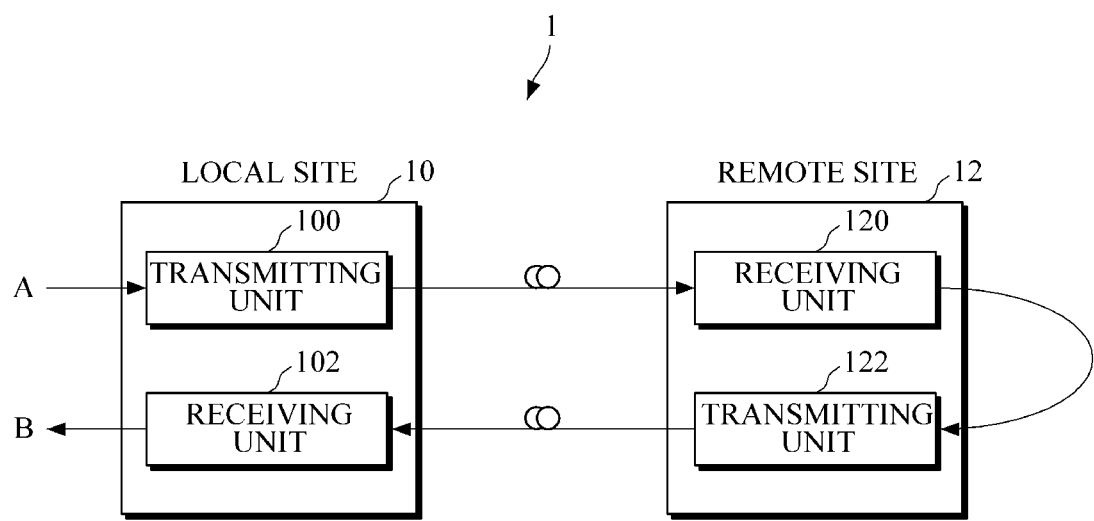
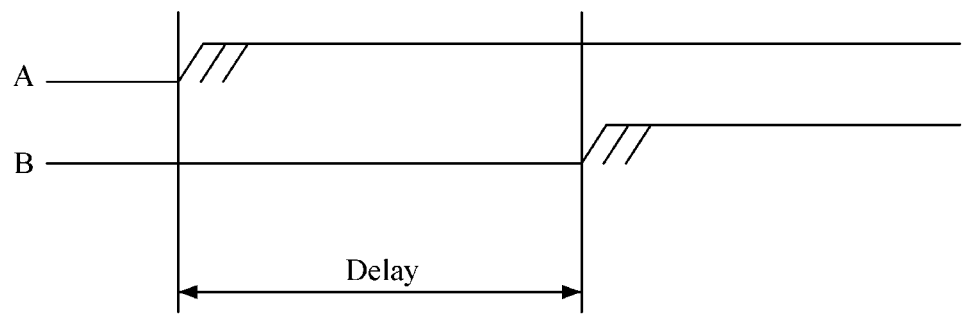

FIG. 6A

| Row# \ Column# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | Frame Alignment overhead | | | | | | | OTUk overhead | | | | | | | OPUk overhead | |
| 2 | RES | PM& TCM | TCM ACT | TCM6 | | | | TCM5 | | TCM4 | | | FTFL | | | |
| 3 | TCM3 | | | TCM2 | | | | TCM1 | | PM | | | EXP | | | |
| 4 | GCC1 | | GCC2 | | APS/PCC | | | RES | | | | | | | | |

FIG. 6C

| MFAS bits 5 6 7 8 | 1 | 2 | 3 | 4 | 5 | 6 | 7 | 8 |
|---|---|---|---|---|---|---|---|---|
| 0 0 0 0 | DMt1 | DMt2 | DMt3 | DMt4 | DMt5 | DMt6 | DMp | RES |
| 0 0 0 1 | RES ||||||||
| 0 0 1 0 | BDp[15:8] ||||||||
| 0 0 1 1 | BDp[7:0] ||||||||
| 0 1 0 0 | BDt1[15:8] ||||||||
| 0 1 0 1 | BDt1[7:0] ||||||||
| 0 1 1 0 | BDt2[15:8] ||||||||
| 0 1 1 1 | BDt2[7:0] ||||||||
| 1 0 0 0 | BDt3[15:8] ||||||||
| 1 0 0 1 | BDt3[7:0] ||||||||
| 1 0 1 0 | BDt4[15:8] ||||||||
| 1 0 1 1 | BDt4[7:0] ||||||||
| 1 1 0 0 | BDt5[15:8] ||||||||
| 1 1 0 1 | BDt5[7:0] ||||||||
| 1 1 1 0 | BDt6[15:8] ||||||||
| 1 1 1 1 | BDt6[7:0] ||||||||

FIG. 7

| MFAS bits 5 6 7 8 | 1 | 2 | 3 | 4 | 5 | 6 | 7 | 8 |
|---|---|---|---|---|---|---|---|---|
| 0 0 0 0 | DMt1 | DMt2 | DMt3 | DMt4 | DMt5 | DMt6 | DMp | DI ~700 |
| 0 0 0 1 | RES ||||||||
| 0 0 1 0 | BDp[15:8] ||||||||
| 0 0 1 1 | BDp[7:0] ||||||||
| 0 1 0 0 | BDt1[15:8] ||||||||
| 0 1 0 1 | BDt1[7:0] ||||||||
| 0 1 1 0 | BDt2[15:8] ||||||||
| 0 1 1 1 | BDt2[7:0] ||||||||
| 1 0 0 0 | BDt3[15:8] ||||||||
| 1 0 0 1 | BDt3[7:0] ||||||||
| 1 0 1 0 | BDt4[15:8] ||||||||
| 1 0 1 1 | BDt4[7:0] ||||||||
| 1 1 0 0 | BDt5[15:8] ||||||||
| 1 1 0 1 | BDt5[7:0] ||||||||
| 1 1 1 0 | BDt6[15:8] ||||||||
| 1 1 1 1 | BDt6[7:0] ||||||||

FIG. 8

| MFAS bits 5 6 7 8 | 1 | 2 | 3 | 4 | 5 | 6 | 7 | 8 |
|---|---|---|---|---|---|---|---|---|
| 0 0 0 0 | DMt1 | DMt2 | DMt3 | DMt4 | DMt5 | DMt6 | DMp | DI |
| 0 0 0 1 | BDt1[16] | BDt2[16] | BDt3[16] | BDt4[16] | BDt5[16] | BDt6[16] | BDp[16] | RES |
| 0 0 1 0 | BDp[15:8] | | | | | | | |
| 0 0 1 1 | BDp[7:0] | | | | | | | |
| 0 1 0 0 | BDt1[15:8] | | | | | | | |
| 0 1 0 1 | BDt1[7:0] | | | | | | | |
| 0 1 1 0 | BDt2[15:8] | | | | | | | |
| 0 1 1 1 | BDt2[7:0] | | | | | | | |
| 1 0 0 0 | BDt3[15:8] | | | | | | | |
| 1 0 0 1 | BDt3[7:0] | | | | | | | |
| 1 0 1 0 | BDt4[15:8] | | | | | | | |
| 1 0 1 1 | BDt4[7:0] | | | | | | | |
| 1 1 0 0 | BDt5[15:8] | | | | | | | |
| 1 1 0 1 | BDt5[7:0] | | | | | | | |
| 1 1 1 0 | BDt6[15:8] | | | | | | | |
| 1 1 1 1 | BDt6[7:0] | | | | | | | |

800

APPARATUS AND METHOD FOR MEASURING A DELAY

CROSS-REFERENCE TO RELATED APPLICATION(S)

This application claims the benefit under 35 U.S.C. §119 (a) of Korean Patent Application Nos. 10-2011-0122121, filed on Nov. 22, 2011, and 10-2012-0109398, filed on Sep. 28, 2012, in the Korean Intellectual Property Office, the entire disclosures of which are incorporated herein by references for all purposes.

BACKGROUND

1. Field

The following description relates to an optical transport network, and more particularly, to a signal delay measurement technique for an optical transport network.

2. Description of the Related Art

A function for measuring a delay in an optical transport network (OTN) is required because the OTN enables the transmission of a client signal that is delay sensitive via a high-speed interface, such as a fiber channel, a common public radio interface (CPRI), and the like.

SUMMARY

The following description relates to an apparatus and method for measuring an accurate delay.

In one general aspect, there is provided an apparatus for measuring a delay, including: an overhead inserting unit configured to inserting a time stamp into an overhead of a multiframe to be transmitted from a first location to a second location; an overhead extracting unit configured to extract a time stamp from an overhead of a multiframe received from the second location, the time stamp including bypass delay information of the second location; and a delay measuring unit configured to measure a round trip delay between the first location and the second location using the inserted time stamp and the extracted time stamp and adjust the measured round trip delay using the extracted bypass delay information.

In another general aspect, there is provided an apparatus for measuring a delay, including: an overhead extracting unit configured to extract a time stamp from an overhead of a multiframe transmitted from a first location and received at a second location; an overhead inserting unit configured to insert both the time stamp extracted by the overhead extracting unit and bypass delay information of the second location into an overhead of a multiframe to be transmitted to the first location; and a delay measuring unit configured to calculate bypass delay information to be inserted into the overhead of the multiframe.

In yet another general aspect, there is provided a method of measuring a delay, including: inserting a time stamp into an overhead of a multiframe at a first location and transmitting the multiframe to a second location; receiving at the first location a multiframe from the second location, and extracting a time stamp from an overhead of the received multiframe, the time stamp including bypass delay information of the second location; and measuring a round trip delay between the first location and the second location using the inserted time stamp and the extracted time stamp and adjusting the measured round trip delay using the extracted bypass delay information.

In still another general aspect, there is provided a method of measuring a delay, including: receiving, at a first location, a multiframe from a second location and extracting a time stamp from an overhead of the received multiframe; inserting both the extracted time stamp and a bypass delay value measured at the second location into an overhead of a multiframe to be transmitted to the first location; and transmitting the multiframe with the bypass delay value inserted into the overhead to the first location.

Other features and aspects may be apparent from the following detailed description, the drawings, and the claims.

BRIEF DESCRIPTION OF THE DRAWINGS

FIG. 1 is a diagram illustrating a network system according to an exemplary embodiment of the present invention.

FIGS. 6A to 6C are diagrams illustrating a configuration of an ODU frame overhead according to an exemplary embodiment of the present invention.

FIG. 7 is a diagram illustrating PM&TCM byte of an ODU frame overhead according to another exemplary embodiment of the present invention.

FIG. 8 is a diagram illustrating PM&TCM byte of an ODU frame overhead according to yet another exemplary embodiment of the present invention.

Figure 2:
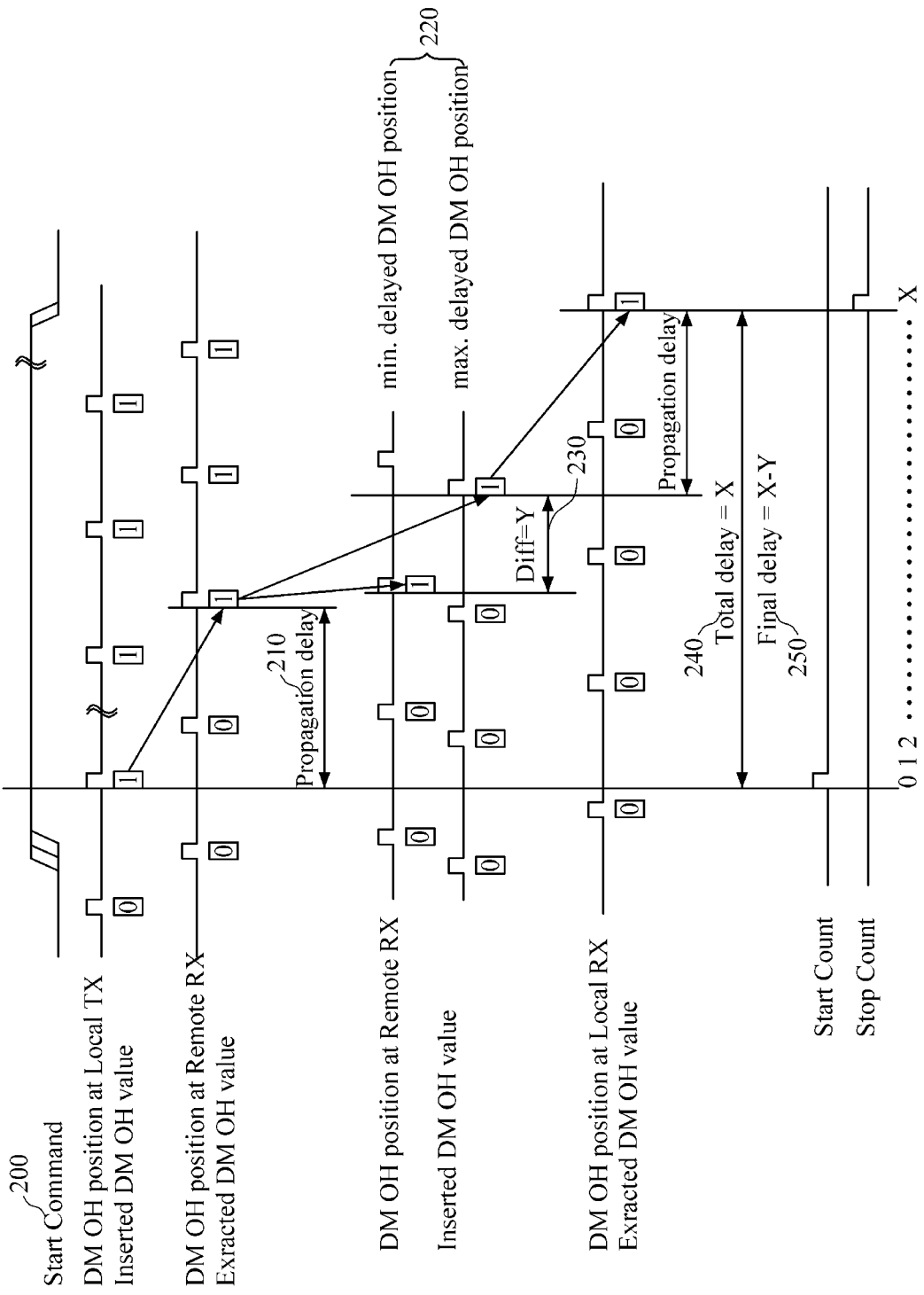
FIG. 2 is a diagram illustrating forms of signals over delay calculation paths according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a network system according to an exemplary embodiment of the present invention. Referring to FIG. 1, the network system 1 includes a plurality of nodes. Each node transmits a signal over a network. The exemplary embodiment described herein is to measure a propagation delay time of a signal traveling between the nodes. The network may be an optical transport network (OTN), and a transmission signal may be an optical data unit (hereinafter, referred to as "ODUk (k=0, 1, 2, 3, 4, flex)" frame.

In FIG. 1, a master node 10 is located at a local site and a slave node 12 is located at a remote site. The master node 10 includes a transmitting unit 100 and a receiving unit 102, and the slave node 12 also includes a transmitting unit 122 and a receiving unit 120. The transmitting units 100 and 122 transmit a signal and the receiving units 102 and 120 receive the signal. The master node 10 is a source node transmitting a signal for delay measurement and the slave node 12 is a receiving node receiving the signal from the master node 10.

As shown in FIG. 1, when the master node 10 at the local site transmits a signal to the remote site, the slave node 12 at the remote site loopbacks the received signal to the local site, and then the master node 10 measures a signal propagation delay using the received loopback signal. That is, the master node 10 measures time from when the master node 10 transmits the signal at position A to when the loopback signal from the slave node arrives at position B. At this time, the master node 10 may be able to measure a round trip delay by calculating a time difference between position A and position B. Under the assumption that a transmission path and a reception path are substantially the same, half of the measured round trip delay may be regarded as one-way propagation delay.

ITU-T SG15 standards define path monitoring (PM) & tandem connection monitoring (TCM) field of 1 byte belonging to an overhead of each ODUk (k=0, 1, 2, 3, 4, flex) frame so as to measure a real-time propagation delay using the signal transmission scheme as illustrated in FIG. 1. For example, a one-bit toggle signal is assigned not only to one ODU path signal, but also to each of six ODU TCM signals in an effort to measure a round trip delay of an ODU signal. The PM&TCM byte contains one DMp bit and up to six DMt bits. Where the master node 10 desires to measure a round trip delay of an ODU path, a signal of DMp that is the $7^{th}$ bit of the PM&TCM byte is toggled. More specifically, the signal of DMp is toggled from zero to one or from one to zero. The master node 10 counts the number of clocks of an ODU frame so as to measure a delay from the time when the DMp signal is toggled at the local site until the time the toggled signal is loopbacked from the remote site and returns to the local site.

Based on the toggled signal and the number of counted clocks of the ODU frame, the round trip delay of the ODU frame can be estimated. Since the transmitting unit 100 and the receiving unit 102 of the master node 10 at the local site do not have the same clock or the same frame phase difference, a bypass delay greater than a frame period may be produced. In detail, the signal toggled at the local site is extracted by the receiving unit 120 at the remote site and the extracted signal is inserted into DMp in the ODU frame overhead and the ODU frame with the extracted signal is transmitted to the local site by the transmitting unit 122 at the remote site. At this time, a bypass delay as at least one frame may be incurred. In addition, since a bypass delay exists between a DMp transmitting frame and a DMp receiving frame at the local site, even when a maximum bypass delay is a half frame, a delay measurement resolution may be more than 2.5 times of the ODU frame. For example, ODU 0 has a delay measurement resolution that is close to 250 µs. In a case where a delay is required to be smaller than 100 µs, it is not possible to determine via a function with a high delay measurement resolution whether the delay measurement capability is satisfactory or not.

Even if clock count is performed using a precision clock with a demultiplied transfer rate of an oscillator or ODU so as to increase resolution of delay measurement in the system illustrated in FIG. 1, when the receiving unit 120 at the remote site extracts a toggle signal from the received frame, inserts the extracted toggle signal into an overhead DMp of a transmission frame and transmits the frame back to the local site, a bypass delay of at least ODU 1 frame may occur due to a time difference between the received frame and the transmission frame.

Even if the resolution of delay measurement is accurately reduced, because the receiving unit 120 and the transmitting unit 122 at the remote site are not synchronized with each other, an additional delay may randomly occur in ODU 1 frame until a DMp signal extracted by the receiving unit 120 is inserted as a DMp signal into the ODU frame to be transmitted by the transmitting unit 122.

To solve the aforementioned drawbacks, the master node 10 transfers a toggle signal to the slave node 12 by inserting the toggle signal for delay measurement into a position of DM byte in the ODU frame overhead. The receiving unit 120 of the slave node 12 extracts the toggle signal. The transmitting unit 120 of the slave node 12 transfers the toggle signal back to the master node 10 by inserting the extracted toggle signal into a position of DM byte in an ODU frame overhead of the transmitting unit 120. As shown in FIG. 1, the transmitting units 100 and 122 generally use independent clocks of each other and the receiving units 102 and 120 extract the clocks from the signal transmitted from the transmitting units 100 and 122. As a result, transmission frame timing and reception frame timing differ from each other. Processes of transmitting the toggle signal along a path shown in FIG. 1 in consideration of the frame timing difference are illustrated in FIG. 2.

FIG. 2 is a diagram illustrating forms of signals over delay calculation paths according to an exemplary embodiment of the present invention.

Referring to FIGS. 1 and 2, in response to a start command (e.g., start command=1) 200 to initiate delay measurement being received from an external device, the node at the local site inserts a toggled toggle signal into a position of a DM overhead of an ODU frame, and transmits the ODU frame with the inserted toggle signal to the node at the remote site. The example shown in FIG. 2 assumes that the toggle signal is toggled from zero to one. In response to the ODU frame being received from the local site, the node at the remote site extracts the toggle signal from the DM overhead of the received ODU frame, and a time point of extraction corresponds to a propagation delay 210 shown in FIG. 2. A value extracted from the DM overhead at the remote site returns to the local site while being inserted into a position of a DM overhead of an ODU frame of the remote site. In this case, since reception frame timing and transmission frame timing are different from each other as denoted by 220, temporal positions of DM overhead are different from when the ODU frame is received by the remote site and when the ODU frame is transmitted from the remote site. Hence, there is a bypass delay Y(=Diff) 230 between the reception frame and the transmission frame. The bypass delay Y 230 ranges up to 1 frame time interval, and may vary at each time of measurement. According to the exemplary embodiment, delay measurement may be achieved with high resolution by adjusting a bypass delay Y 230 when a round trip delay is measured. An example of an ODU frame to be transmitted for delay measurement is illustrated in FIG. 3.

Figure 3:
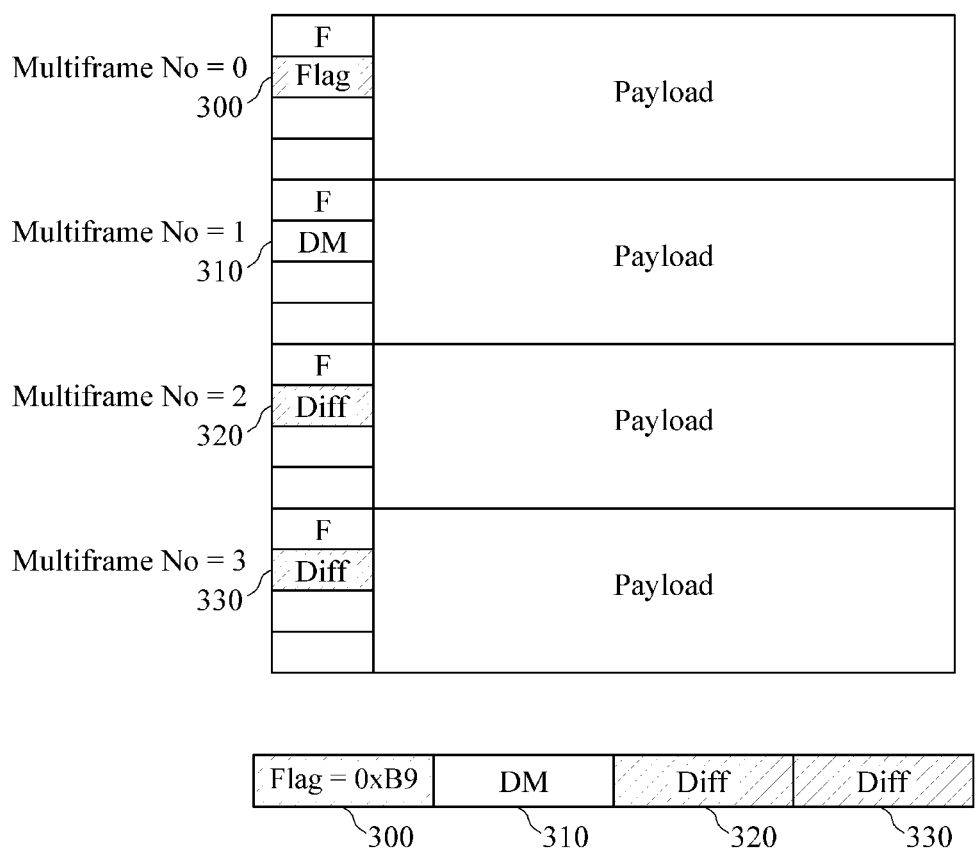
FIG. 3 is a diagram illustrating an ODU multiframe according to an exemplary embodiment of the present invention.

FIG. 3 is a diagram illustrating an ODU multiframe according to an exemplary embodiment of the present invention. Referring to FIGS. 2 and 3, to measure a round trip delay, a bypass delay Y 230 is subtracted from a delay value X 240 measured at the local site, and thereby an accurate delay value 250 can be obtained. However, it is not possible to know the bypass delay Y 230 at the local site, and it is thus required for the local site to receive the bypass delay Y 230 from the remote site. Because only one byte is used for delay measurement in a measurement overhead of a general frame, there is no space used for the transmission of the bypass delay Y 230. It may be possible to simply increase the number of overhead bytes, but such increase in bytes may result in inefficient use of overhead and, moreover, in modifying frame format. Hence, the exemplary embodiment of the present invention provides a multiframe structure as shown in FIG. 3, which allows the use of only one-byte of a frame overhead, without modifying the existing frame format.

Referring to FIG. 3, the multiframe structure may include multiple frames. At a position of a DM overhead of the first frame, a flag 300 with a fixed value (for example, 0xB9) is located. The flag 300 is similar in function to a frame alignment signal (FAS) of a frame. That is, the flag 300 being received may enable identification of a frame to which the first DM overhead of the frame is delivered, and thus it can be estimated which data is received by the next frame. In the second frame, a toggle signal 310 is used at a position of a DM overhead byte. The third and fourth frames each have "Diff" at a position of a DM overhead byte. Diff is a 16-bit bypass delay Y 230 which is a value corresponding to a time difference between transmission and reception at the remote site. More specifically, in the third frame, the ninth to sixteenth bits, that is, Diff[15:0] 320 are inserted at a Diff position, and in the fourth frame, the first to eighth bits, Diff[7:0] 330 are inserted into a Diff position. At the local site, a value of zero is inserted as the first Diff into a signal. When the original signal of the local site is looped back from the remote site, a loopback delay is zero. If a value other than zero is inserted into the signal, a difference as large as the inserted value is produced. Hence, to prevent such difference, the value of zero is inserted into the signal at the local site.

A node at the remote site receives the multiframe from the local site. The node at the remote site extracts the flag from a position of DM overhead byte in the first frame of the received multiframe to identify a multiframe position. In the case where a value of DM overhead of the second frame is toggled, the node at the remote site stores a toggle signal to return it to the local site, and measures a Diff value that is a bypass delay from the time when the toggle signal is stored to the time when the stored toggle signal is inserted into the second DM overhead byte of a multiframe at the remote site. Thereafter, Diff[15:8] is inserted into DM overhead byte of the third frame and Diff[7:0] is inserted into DM overhead byte.

In one example, the node at the local site may identify a position of the multiframe by detecting the flag from a position of the overhead byte in the first frame of the multiframe received from the remote site. In addition, in response to a value of a DM overhead of the second frame being toggled, X counter is stopped. Then, Diff values (Y values) are extracted from DM overhead bytes of the respective third and fourth frames. The node at the local site calculates an accurate delay by subtracting the received Y value from a value of X counted at the local site.

Figure 4:
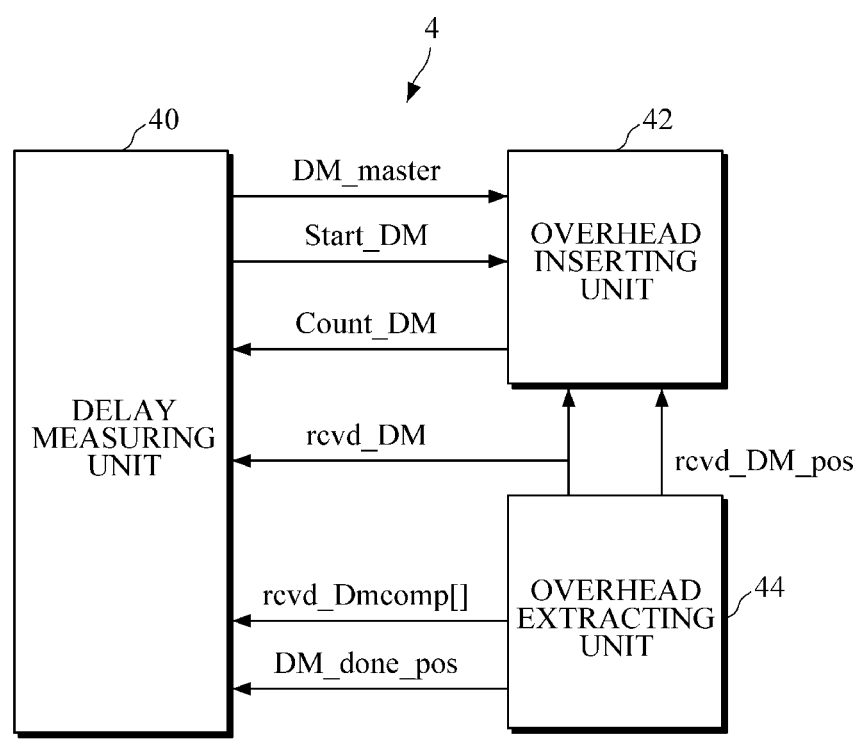
FIG. 4 is a diagram illustrating a configuration of an apparatus for measuring a delay.

FIG. 4 is a diagram illustrating a configuration of an apparatus for measuring a delay. Referring to FIG. 4, the apparatus 4 includes a delay measuring unit 40, an overhead inserting unit 42, and an overhead extracting unit 44. The apparatus 4 may be implemented as a master node at a local site or as a slave node at a remote site.

The delay measuring unit 40 receives a command, DM_master or DM_slave, for determining whether a node of interest is a master node or a slave node with respect to delay measurement, and delivers the received command to the overhead inserting unit 42.

In one example, where the node of interest is a slave node, the delay measuring unit 40 does not measure a delay, and a toggle signal that has been extracted by the overhead extracting unit 44 is inserted into the overhead inserting unit 42 and delivered to the master node. The overhead extracting unit 44 transmits, to the overhead inserting unit 42, timing information, rcvd_DM_pos, which is about a time point at which the toggle signal is received from the master node. The overhead inserting unit transmits the received timing information, rcvd_DM_pos, to the delay measuring unit 40, and the delay measuring unit 40 starts Diff counting.

In a case where the node of interest is a master node, the delay measuring unit 40 generates a start_DM signal in response to a delay measurement start command from an external device, and transmits the generated start_DM signal to the overhead inserting unit 42. The overhead inserting unit 42 inserts a toggle signal into an overhead of a transmission frame in response to the start_DM signal received from the delay measuring unit 40. In addition, the overhead inserting unit 42 delivers Count_DM signal which is timing information about the time of insertion to the delay measuring unit 40, and the delay measuring unit 40 starts counting for delay measurement.

The overhead extracting unit 44 extracts a rcvd_DM signal, i.e., a toggle signal from an overhead of a reception frame, and delivers the extracted rcvd_DM signal to the delay measuring unit 40. The delay measuring unit 40 stops counting for delay measurement if the rcvd_DM signal received from the overhead extracting unit 44 is toggled. In addition, the overhead extracting unit 44 extracts rcvd_DM_comp Y value from a DM overhead of the reception frame, and delivers the extracted rcvd_DM_comp Y value to the delay measuring unit 40. Then, the delay measuring unit 40 calculates an accurate round trip delay by subtracting the rcvd_DM comp Y value from a delay value X.

Figure 5:
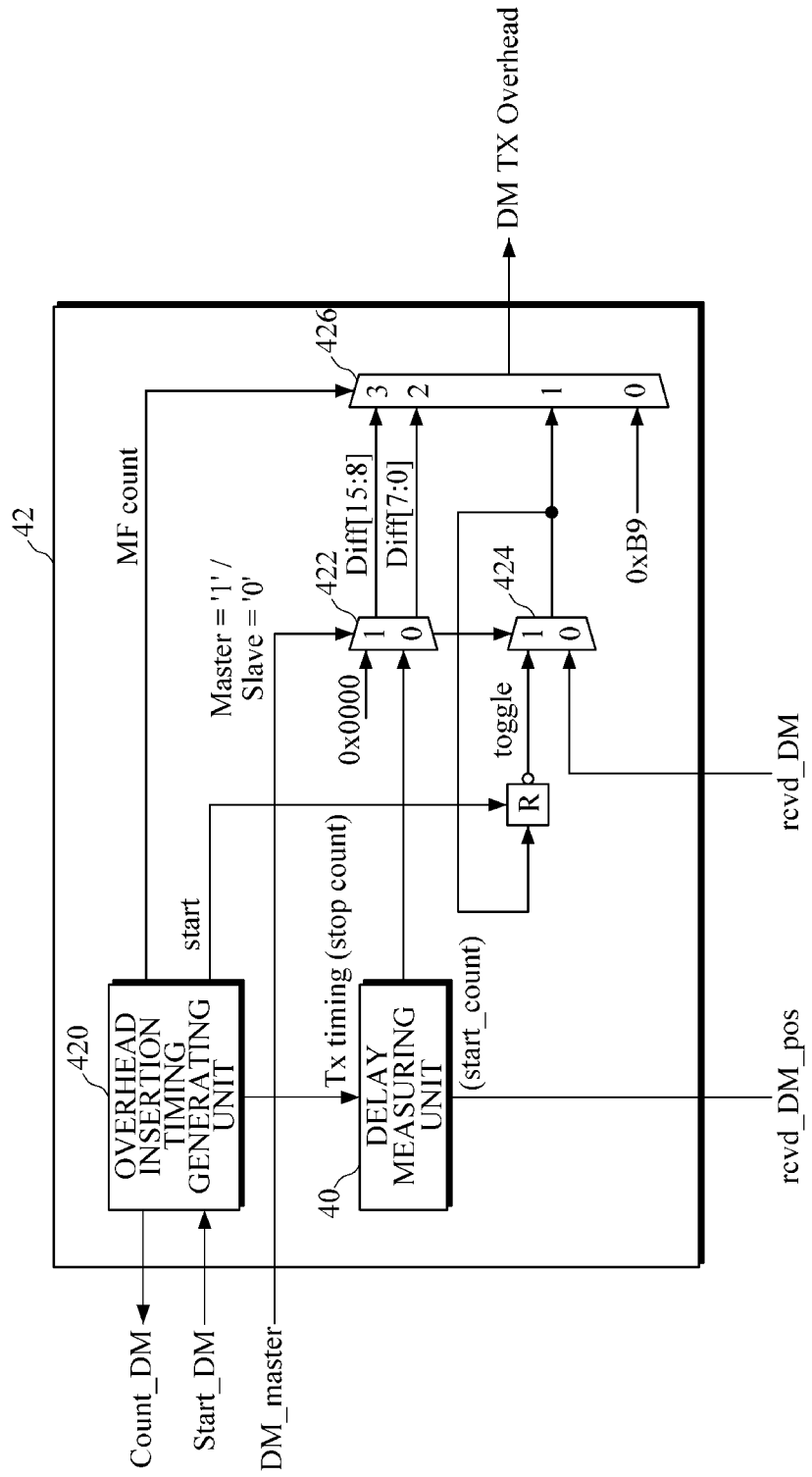
FIG. 5 is a diagram illustrating a configuration of the overhead inserting unit shown in FIG. 4 according to an exemplary embodiment of the present invention.

FIG. 5 is a diagram illustrating a configuration of the overhead inserting unit shown in FIG. 4 according to an exemplary embodiment of the present invention. Referring to FIG. 5, the overhead inserting unit 42 includes a first multiplexing unit 422, a second multiplexing unit 424, and a third multiplexing unit 426.

Where a node of interest is a master node, the first multiplexing unit 422 of the overhead inserting unit 42 inserts a Diff value, 0x0000, into an overhead of a multiframe to be transmitted to a slave node, and the second multiplexing unit 424 inserts a toggle signal into the overhead of the multiframe to be transmitted. On the contrary, where the node of interest is a slave node, the first multiplexing unit 422 inserts a Diff value measured by the Diff delay measuring unit 40 shown in FIG. 4 into an overhead to be transmitted to the master node, and the second multiplexing unit 424 inserts a toggle signal (rcvd_DM) extracted by the overhead extracting unit 44 shown in FIG. 4 into the overhead to be transmitted to the master node.

Where the node of interest is a master node, the third multiplexing unit 426 enables a flag (0x89), a DM toggle signal, Diff[15:8] signal and Diff[7:0] signal to be selected according to MF count timing such that an overhead to be transmitted to a slave node can be inserted into a multiframe. Where the node of interest is a slave node, the delay measuring unit 40 receives a timing signal, rcvd_DM_pos, which relates to a timing of the reception of a toggle signal extracted by the overhead extracting unit 44, and starts Diff counting. In addition, an overhead insertion timing generating unit 420 generates a timing signal about the time of insertion of the toggle signal into the overhead, and transmits the timing signal to the delay measuring unit 40. In response to the timing signal about the time of insertion of the toggle signal, the delay measuring unit 40 stops the Diff counting. A value of Diff counting at the time of stopping is delivered to the first multiplexing unit 422.

Figure 6B:
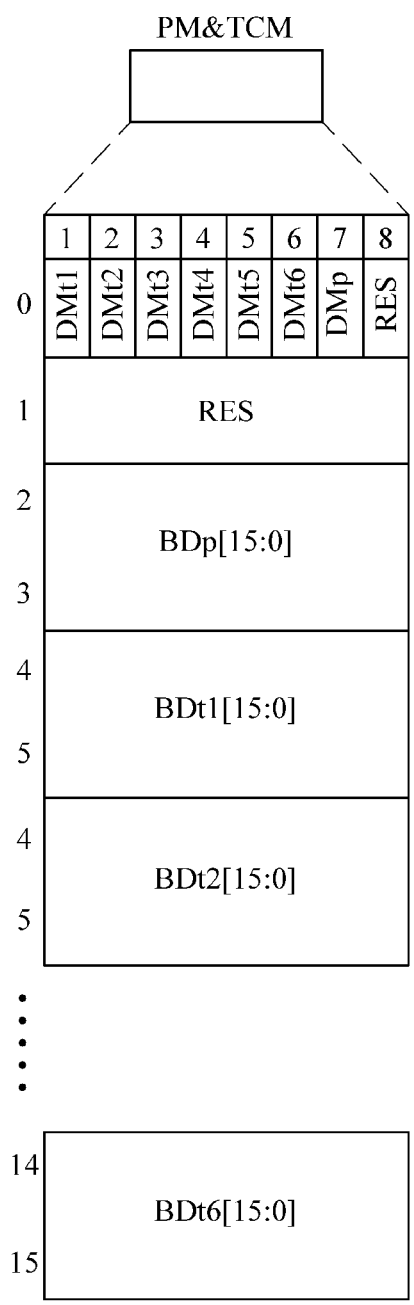

FIGS. 6A to 6C are diagrams illustrating a configuration of an ODU frame overhead according to an exemplary embodiment of the present invention.

Referring to FIG. 6A, row 1, column 7 in an OTN frame defines a multi-frame alignment sequence (MFAS) for determination of a multiframe. In the embodiment illustrated in FIG. 3, the ODU frame defines a flag in the one-byte DM overhead to generate a own multiframe since an MFAS signal does not exist in the ODU frame. However, in the embodiment illustrated in FIG. 6A, the OTN frame is enabled to determine the multiframe using the MFAS byte, and thus an individual flag byte is not required in the DM overhead.

FIGS. 6B and 6C are diagrams illustrating an enlarged PM&TCM field shown in FIG. 6A. The PM&TCM field shown in FIGS. 6A and 6C employs the existing standard which specifies toggle signals as DMp, DMt1, ..., and DMt6, such that delay measurements of one ODU path signal and each of six ODU TCM signals are performed independently of each other. However, the $0^{th}$ frame out of sixteen multiframes has DMp and Dmti toggle signals inserted therein, and there is no need to insert the toggle signals into the rest of the multiframes. It is possible to insert the toggle signals into the first multiframe.

The first multiframe may be specified as RESERVED (RES) byte. The second to third multiframes may have a delay measurement value, i.e., a Diff value, obtained at the time of loopback of an ODU path signal from a remote site. This overhead is temporarily displayed as a bypass delay (BDp). The fourth to fifth frames may have a delay measurement value, i.e., a Diff value, obtained at the time of loopback of ODU TCM 1 signal from the remote site. This overhead may be displayed as bypass delay (BDt1). In a similar manner, the sixth to seventh frames may have BDt2 byte inserted therein, the eighth to ninth frames may have BDt3 byte inserted therein, the tenth to eleventh frames may have BDt4 byte inserted therein, the twelfth to thirteenth frames have BDt5 byte inserted therein, and the fourteenth to fifteenth frames have BDt6 byte inserted therein.

FIG. 7 is a diagram illustrating PM&TCM byte of an ODU frame overhead according to another exemplary embodiment of the present invention. Referring to FIG. 7, the eighth bit which has been specified as RESERVED (RES) byte in the $0^{th}$ frame for mutual compatibility with an existing delay measurement apparatus is utilized as DELAY INDICATOR (DI) byte 700. For example, when a DI value is "0", only toggle signals, such as DMp and DMti, are inserted into the PM&TCM byte, and thereby the mutual compatibility with the existing apparatus is maintained. "1" inserted as the DI value indicates the support of an enhanced delay measurement apparatus, and thus BDp overhead value and BDti overhead value are inserted into the multiframe.

FIG. 8 is a diagram illustrating PM&TCM byte of an ODU frame overhead according to yet another exemplary embodiment of the present invention. In the embodiments illustrated in FIGS. 6A, 6B, 6C and 7, the first multiframe is specified as RESERVED (RES) byte, whereas the PM&TCM byte shown in FIG. 8, each of BDp and BDti of 16 bits can be extended to 17 bits as denoted by 800. This method may be implemented by adding one measurement bit while maintaining 16 multiframes when 16-bit BDp or BDti are not sufficient to an increased use clock for a high resolution. In a case where the 17 bits are not sufficient, the number of multiframes may be increased from 16 to 32 or more.

Figure 9:
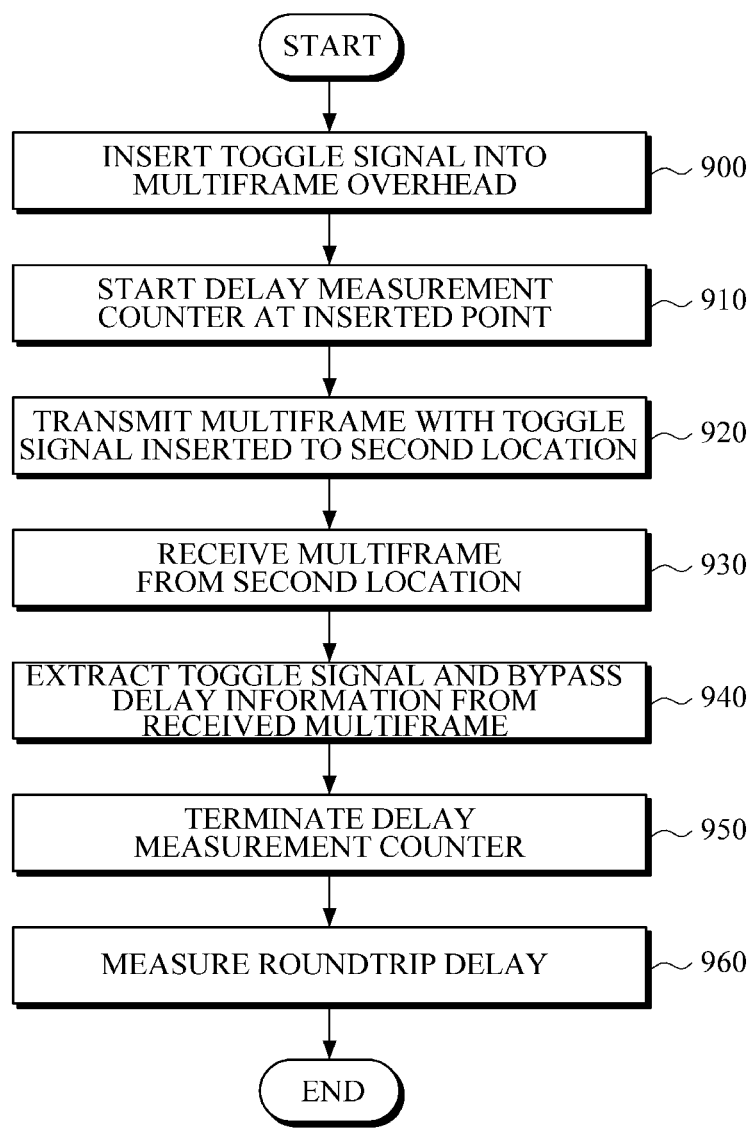
FIG. 9 is a flowchart illustrating a method of measuring a delay at a local site according to an exemplary embodiment of the present invention.

FIG. 9 is a flowchart illustrating a method of measuring a delay at a local site according to an exemplary embodiment of the present invention. Referring to FIG. 9, a delay measurement apparatus at the local site inserts a toggle signal and bypass delay information into an overhead of a multiframe in operation 900, and start counting for delay measurement at the time of insertion in operation 910. The inserted bypass delay information value may be "0". Thereafter, the multiframe with the toggle signal inserted into the overhead is transmitted to a node at a remote site in operation 920.

Thereafter, the delay measurement apparatus at the local site receives the multiframe from the remote site in operation 930, and extracts a toggle signal and a time stamp including bypass delay information of the remote site in operation 940. At this time, if the extracted toggle signal has been toggled, counting for delay measurement ends in operation 950, and a round trip delay between the local site and the remote site is measured using the inserted time stamp and the extracted time stamp in operation 960. The extracted bypass delay information is a value counted from the time when the overhead is extracted at the remote site to the time when the overhead is inserted at the remote site. In operation 960, the delay measurement apparatus may calculate an accurate round trip delay by subtracting the bypass delay value extracted from the overhead of the multiframe received from the remote site from a value measured from the time when the delay measurement starts to the time when it ends.

Figure 10:
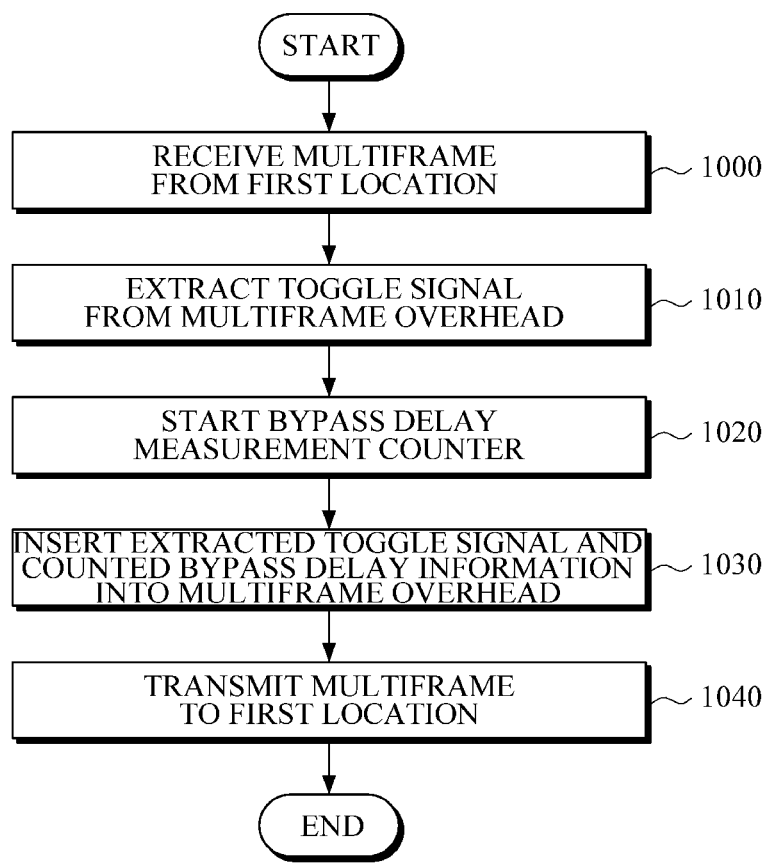
FIG. 10 is a flowchart illustrating a method of measuring a delay at a remote site according to an exemplary embodiment of the present invention.

FIG. 10 is a flowchart illustrating a method of measuring a delay at a remote site according to an exemplary embodiment of the present invention. Referring to FIG. 10, a delay measurement apparatus at the remote site receives a multiframe from a local site in operation 1000 and extracts a toggle signal from an overhead of the received multiframe in operation 1010. In addition, at the time of extracting the toggle signal, the apparatus starts measuring a bypass delay in operation 1020. Thereafter, the delay measurement apparatus inserts the extracted toggle signal, along with a bypass delay value measured at the remote site, into an overhead of a multiframe to be transmitted to the local site in operation 1030. The bypass delay value is a clock count value from the time of extracting the toggle signal at the remote site to the time of inserting the toggle signal at the remote site. Then, a multiframe with a time stamp inserted into an overhead is transmitted to a node at the local site wherein the time stamp includes the bypass delay value in operation 1040.

According to the above-described exemplary embodiments of the present invention, in measurement of a round trip delay between a first location and a second location, it is possible to obtain an accurate round trip delay by adjust a bypass delay which is generated in frame transmission/reception at the second location. Furthermore, it is possible to ensure the mutual compatibility with an existing delay measurement apparatus and to measure a delay with a high resolution by using only one overhead byte.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for measuring a delay, comprising:
an overhead inserting unit configured to insert a time stamp into an overhead of a first multiframe to be transmitted from a first location to a second location;
an overhead extracting unit configured to extract a time stamp from an overhead of a second multiframe received from the second location, the time stamp including bypass delay information of the second location; and
a delay measuring unit configured to measure a round trip delay between the first location and the second location using the inserted time stamp and the extracted time stamp and adjust the measured round trip delay using the extracted bypass delay information,
wherein a delay indicator for indicating mutual compatibility with another apparatus for measuring delay is inserted in the overhead of the first multiframe,
wherein the overhead inserting unit is further configured to, in response to the delay indicator value being a first value, insert only a toggle signal from the overhead of the first multiframe, and in response to the delay indicator value being a second value, insert bypass delay information together with the toggle signal from the overhead of the first multiframe.

2. The apparatus of claim 1, wherein the overhead inserting unit is configured to insert a time stamp into each overhead of individual frames of the first multiframe to be transmitted to the second location, the inserted time stamp includes bypass delay information and the toggle signal to start delay measurement and the inserted bypass delay information has a value of 0.

3. The apparatus of claim 2, wherein the time stamp to be inserted into the overhead of the first multiframe to be transmitted to the second location further includes a flag value to identify the first multiframe at the second location.

4. The apparatus of claim 2, wherein the time stamp to be inserted into the overhead of the first multiframe to be transmitted to the second location further includes a multiframe alignment sequence value to identify the first multiframe at the second location.

5. The apparatus of claim 1, wherein the overhead extracting unit is configured to extract a time stamp from each overhead of individual frames of the second multiframe received from the second location, the extracted time stamp includes the bypass delay information of the second location and a toggle signal to terminate delay measurement and the extracted bypass delay information is a clock count value obtained from an overhead extraction time point at the second location to an overhead insertion time point at the second location.

6. The apparatus of claim 1, wherein the overhead inserting unit is configured to insert a toggle signal and bypass delay information into each overhead of individual frames of the first multiframe to be transmitted to the second location, and the overhead extracting unit is configured to extract the toggle signal and the bypass delay information from each overhead of individual frames of the first multiframe received from the second location.

7. The apparatus of claim 6, wherein the delay measuring unit is configured to start delay measurement at a time when the overhead inserting unit inserts the toggle signal, to terminate delay measurement in response to the toggle signal, which is extracted by the overhead extracting unit, being toggled, and to measure a round trip delay by subtracting a value of the bypass delay information, which is extracted by the overhead extracting unit, from a delay value measured from a delay measurement starting time to a delay measurement termination time.

8. An apparatus for measuring a delay, comprising:
an overhead extracting unit configured to extract a time stamp from an overhead of a first multiframe transmitted from a first location and received at a second location;
an overhead inserting unit configured to insert both the time stamp extracted by the overhead extracting unit and bypass delay information of the second location into an overhead of a second multiframe to be transmitted to the first location; and
a delay measuring unit configured to calculate bypass delay information to be inserted into the overhead of the second multiframe,
wherein a delay indicator for indicating mutual compatibility with another apparatus for measuring delay is provided in the overhead of the first multiframe,
wherein the overhead inserting unit is further configured to, in response to the delay indicator value being a first value, insert only a toggle signal into the overhead of the second multiframe, and in response to the delay indicator value being a second value, insert bypass delay information together with the toggle signal into the overhead of the second multiframe.

9. The apparatus of claim 8, wherein the overhead inserting unit is configured to insert, into each overhead of individual frames of the second multiframe to be transmitted to the first location, a time stamp which includes bypass delay information of the second location and a toggle signal to terminate delay measurement.

10. The apparatus of claim 9, wherein the bypass delay information extracted from the overhead of the first multiframe received from the first location by the overhead extracting unit has a value of 0 and the bypass delay information inserted into the overhead of the second multiframe to be transmitted to the first location by the overhead inserting unit is a clock count value obtained from an overhead extraction time point at the second location to an overhead insertion time point at the second location.

11. The apparatus of claim 8, wherein the bypass delay information inserted into the overhead of the second multiframe to be transmitted to the first location is bypass delay information with respect to one optical data unit path and each of multiple optical data unit tandem connection monitors.

12. The apparatus of claim 8, wherein the delay measuring unit is configured to start clock count at an overhead extraction time of the overhead extracting unit and terminate the clock count at an overhead insertion time of the overhead inserting unit.

13. A method of measuring a delay, comprising:
inserting a time stamp into an overhead of a first multiframe at a first location and transmitting the first multiframe to a second location;
receiving at the first location a second multiframe from the second location, and extracting a time stamp from an overhead of the received second multiframe, the time stamp including bypass delay information of at the second location; and
measuring a round trip delay between the first location and the second location using the inserted time stamp and the extracted time stamp and adjusting the measured round trip delay using the extracted bypass delay information,
wherein a delay indicator value for indicating mutual compatibility with another apparatus for measuring delay is inserted in the overhead of the first multiframe, and wherein in response to the delay indicator value being a first value, inserting only a toggle signal from the overhead of the first multiframe, and in response to the delay indicator value being a second value inserting bypass delay information together with the toggle signal into the overhead of the first multiframe.

14. The method of claim 13, wherein the transmitting of the first multiframe to the second location comprises inserting a time stamp into each overhead of individual frames of the first multiframe to be transmitted to the second location, the inserted time stamp includes the bypass delay information of at the second location and a toggle signal to start delay measurement and the bypass delay information has a value of 0.

15. The method of claim 13, wherein the extracting of the time stamp comprises extracting a time stamp from each overhead of individual frames of the second multiframe received from the second location, the extracted time stamp includes the bypass delay information of the second location and a toggle signal to terminate delay measurement and the extracted bypass delay information is a clock count value obtained from an overhead extraction time at the second location and an overhead insertion time at the second location.

16. The method of claim 13, wherein the adjusting of the measured round trip time comprises starting measuring the delay at a time when a toggle signal is inserted into the overhead of the first multiframe to be transmitted to the second location, terminating measuring the delay in response to a toggle signal, which is extracted from the overhead of the second multiframe received from the second location, being toggled, and measuring the round trip delay by subtracting a value of the bypass delay information, which is extracted from the overhead of the second multiframe received from the second location, from a delay value measured from a delay measurement starting time to a delay measurement termination time.

17. A method of measuring a delay, comprising:
receiving, at a second location, a first multiframe from a first location and extracting a time stamp from an overhead of the received first multiframe;
inserting both the extracted time stamp and a bypass delay value measured at the second location into an overhead of a second multiframe to be transmitted to the first location; and
transmitting the second multiframe with the bypass delay value inserted into the overhead to the first location,
wherein a delay indicator value for indicating mutual combatibility with another apparatus for measuring delay is provided in the overhead of the first multiframe, and
wherein in response to the delay indicator value being a first value, inserting only a toggle signal into the overhead of the second multiframe, and in response to the delay indicator value being a second value, inserting bypass delay information together with the toggle signal into the overhead of the second multiframe.

18. The method of claim 17, wherein the inserting of the bypass delay value comprises inserting a time stamp into each overhead of individual frames of the second multiframe to be transmitted to the first location, the inserted time stamp includes the bypass delay information of the second location and a toggle signal to terminate delay measurement and the inserted bypass delay information is a clock count value obtained from an overhead extraction time at the second location and an overhead insertion time at the second location.

* * * * *